(No Model.)
C. L. NORWOOD.
SQUARE.
No. 443,459. Patented Dec. 23, 1890.
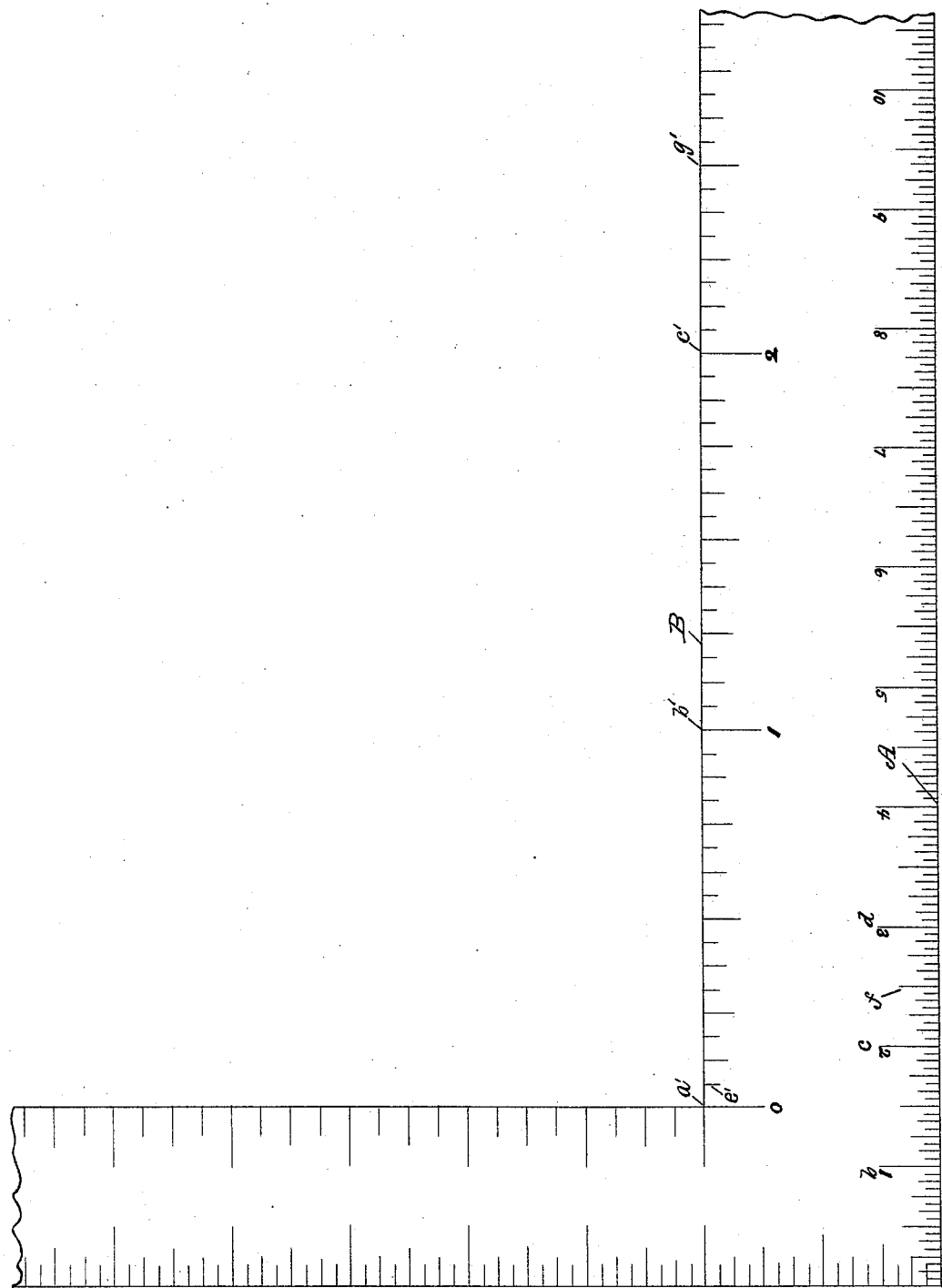
Attest:
M. L. McDermott.
Chauncey Perry.
Inventor:
Clarence L. Norwood,
By E. B. Whitewn, Atty.

UNITED STATES PATENT OFFICE.

CLARENCE L. NORWOOD, OF ROCHESTER, NEW YORK, ASSIGNOR TO JOHN A. CREELMAN, OF SAME PLACE.

SQUARE.

SPECIFICATION forming part of Letters Patent No. 443,459, dated December 23, 1890.

Application filed February 24, 1890. Serial No. 341,516. (No model.)

*To all whom it may concern:*

Be it known that I, CLARENCE L. NORWOOD, of Rochester, in the county of Monroe and State of New York, have invented a new and useful Improvement in Measuring-Scales, which improvement is fully set forth in the following specification and shown in the accompanying drawing.

My invention relates to measuring-scales, such as carpenters' squares; and it consists in the novel manner of dividing the scales, the same being hereinafter fully described, and more particularly pointed out in the claim.

Referring to the drawing, the figure shows a portion at the angle of a carpenter's square.

The invention rests in dividing one portion of the scale into inches, meters, or other common units of measure and equal parts thereof, and dividing another part of the scale into corresponding larger spaces, the ratio between the small spaces and the corresponding large spaces being that between the diameter and the circumference of a circle. For instance, the side A of the square is divided into inches $a\,b, b\,c$, &c., and subdivided into halves, fourths, eighths, and sixteenths. The edge B is divided into corresponding, though larger, units of measure, $a'\,b', b'\,c'$, &c., these latter units of measure being as much larger than the units $a\,b, b\,c$, &c., as the circumference of a circle is larger than its diameter, or as 3.1416 (nearly) is to 1. The larger units $a'\,b'$, &c., are likewise divided into halves, fourths, eighths, and sixteenths, like the smaller units of measure—that is to say, for every space marked off by dividing-lines of the small units of measure there is a corresponding space marked off by the dividing-lines of the large units of measure, the ratio being in every case as 3.1416 to 1, or conversely. Now, if $a\,b$ (one inch) be the diameter of a circle, $a'\,b'$ will be its circumference, which distance can be laid off from the scale by the workman at once and without entering into any usual mathematical calculation to find the circumference. Likewise, if the diameter of a circle be $a\,e$, (one-sixteenth of an inch,) its circumference will be $a'\,e'$, (one-sixteenth of the larger unit of measure $a'\,b'$,) as shown. Should the diameter be two and one-half inches $a\,f$, its circumference will be $a'\,g'$.

On a two-foot carpenter's square the larger scale, giving circumferences, will contain seven full units of measure corresponding to the circumference of a circle seven inches in diameter. Should the circumference of a greater circle—as, for instance, one having a diameter of ten inches—be required it may be found by taking from the scale of circumferences five units of measure twice, and so on for other circles of large diameter. All the dividing-lines of both scales are straight and parallel and at right angles with the respective edges of the measuring-scale.

The units of the two scales are numbered alike—that is to say, the units of each scale are numbered 1 2 3, &c., successively, so that the workman may be readily guided in laying off circumferences corresponding to any given diameters—for instance, the distance 1 of the large scale is the circumference of a circle having a diameter equal to distance 1 of the small scale. Distance 2 on the large scale is the circumference of a scale having a diameter equal to distance 2 on the small scale, &c.

I do not claim, broadly, a measuring-scale of wood, metal, or cloth, having parallel edges or faces divided by lines into units of measure, as inches, feet, or yards, and equal parts thereof, such scales being old and common. But I claim, rather, a scale divided in a peculiar and specified manner—that is to say, a scale having its two edges divided into equal parts, the parts at one edge being greater than at the other edge, and bearing a certain relation to them, the invention being set forth in the claim hereinafter written.

What I claim as my invention is—

A new article of manufacture, the same being a carpenter's or mechanic's square having two blades together forming a right angle, one blade having its edges divided by lines into inches and fractions thereof, and the other blade having its outer edge divided by lines into units of measure and subdivisions thereof and its inner edge divided by lines into units of measure greater than the units of measure at said outer edge and subdivisions thereof, the subdivisions of said greater and said lesser units of measure being equal in number for each unit of measure and bearing the same proportion to each other that said units of measure bear to each other, the proportion between said lesser units of measure and said greater units of measure being the same as the proportion between the diameter and the circumference of a circle.

In witness whereof I have hereunto set my hand this 13th day of February, 1890, in the presence of two subscribing witnesses.

CLARENCE L. NORWOOD.

Witnesses:
    E. B. WHITMORE,
    M. L. McDERMOTT.